United States Patent
Wu et al.

(10) Patent No.: US 11,079,233 B2
(45) Date of Patent: Aug. 3, 2021

(54) STIMULATED BRILLOUIN SCATTERING GYROSCOPE

(71) Applicant: Honeywell International Inc., Morris Plains, NJ (US)

(72) Inventors: Jianfeng Wu, Tucson, AZ (US); Matthew Wade Puckett, Scottsdale, AZ (US); Steven Tin, Edina, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/575,116

(22) Filed: Sep. 18, 2019

(65) Prior Publication Data
US 2021/0180953 A1    Jun. 17, 2021

(51) Int. Cl.
*G01C 19/72* (2006.01)
*H01S 3/30* (2006.01)
*G01C 19/66* (2006.01)

(52) U.S. Cl.
CPC ......... *G01C 19/727* (2013.01); *G01C 19/661* (2013.01); *G01C 19/721* (2013.01); *G01C 19/722* (2013.01); *H01S 3/302* (2013.01)

(58) Field of Classification Search
CPC .... G01C 19/72; G01C 19/721; G01C 19/722; G01C 19/727
USPC ........................................................ 356/464
See application file for complete search history.

(56) References Cited

U.S. PATENT DOCUMENTS

| 4,159,178 A * | 6/1979 | Vali ........................ G01C 19/64 356/461 |
| 10,731,987 B2 * | 8/2020 | Savchenko ............. H01S 3/302 |
| 2015/0288135 A1 * | 10/2015 | Qiu ...................... G01C 19/727 372/28 |
| 2015/0295379 A1 * | 10/2015 | Ozdemir ............... H01S 3/0627 359/337.4 |
| 2017/0067743 A1 | 3/2017 | Salit et al. |
| 2017/0241784 A1 | 8/2017 | Salit et al. |
| 2018/0252527 A1 | 9/2018 | Khajavikhan et al. |
| 2018/0306696 A1 * | 10/2018 | Ozdemir ............ G01N 21/7746 |

(Continued)

OTHER PUBLICATIONS

Chen et al., "Exceptional points enhance sensing in an optical microcavity", Nature, Aug. 10, 2017, pp. 192-206, Macmillan Publishers Limited.

(Continued)

*Primary Examiner* — Michael A Lyons
(74) *Attorney, Agent, or Firm* — Fogg & Powers LLC

(57) ABSTRACT

A stimulated Brillouin scattering gyroscope is provided. A pump laser generates continuous wave (CW) energy that travels through at least one bus waveguide to a waveguide resonator. A reflector is positioned within the waveguide resonator. The reflector is configured to pass at least some of the CW energy in a first direction and reflect at least some stimulated Brillouin scattering (SBS) energy in a second direction. A first detector is in operational communication with the at least one bus waveguide to detect CW energy. An output of the first detector used to at least adjust a pump laser frequency of the pump laser. A second detector is also in operational communication with the at least one bus waveguide. The second detector is used to determine phase shifts in detected SBS energy to determine at least rotation.

18 Claims, 4 Drawing Sheets

(56) References Cited

U.S. PATENT DOCUMENTS

2018/0358772 A1* 12/2018 Puckett ................ G01C 19/661
2020/0249023 A1*  8/2020 Digonnet ............. G01C 19/723

OTHER PUBLICATIONS

Lai et al., "Enhanced sensitivity operation of an optical gyroscope near an exceptional point", Jan. 24, 2019, pp. 1-7.
Ren et al., "Ultrasensitive micro-scale parity-time-symmetric ring laser gyroscope", Optics Letters, Apr. 15, 2017, pp. 1556-1559, vol. 42, No. 8, Optical Society of America.

* cited by examiner

STIMULATED BRILLOUIN SCATTERING GYROSCOPE

BACKGROUND

Navigation grade gyroscopes that have a small size, low weight, and low power consumption have been of the great interest for a long time. An example of a navigation grade gyroscope is an optical gyroscope. Most optical gyroscope are based on the Sagnac effect that converts the rotation rate into the phase shift through a scale factor that is proportional to the gyro size. Such scale factor is independent of rotation rate. The gyroscopes performance (detectable rotation rate/ angle random walk (ARW)) is often limited by the system noise which determines the level of the detectable phase shift. A small gyro size leads to a small scale factor (SF) in optical gyroscopes and often deteriorates the gyro performance. One solution is to improve the signal to noise ratio by reducing the light source noise. However, the quantum noise of the light source sets the gyro ARW limit.

SUMMARY

The following summary is made by way of example and not by way of limitation. It is merely provided to aid the reader in understanding some of the aspects of the subject matter described. Embodiments provide a stimulated brillouin scattering gyroscope that operates at a parity-time (PT) symmetry condition using a waveguide resonator with a reflector.

In one embodiment, a stimulated brillouin scattering gyroscope is provided. The gyroscope includes a pump laser, at least one bus waveguide, a waveguide resonator, a reflector and a first and second detector. The pump laser is configured to generate continuous wave (CW) energy. The at least one bus waveguide is in operational communication with the pump laser. The waveguide resonator is in operational communication with the at least one bus waveguide to receive and pass the CW energy. The reflector is positioned within the waveguide resonator. The reflector is configured to pass at least some of the CW energy in a first direction and reflect at least stimulated Brillion scattering (SBS) energy in a second direction. A first detector is in operational communication with the at least one bus waveguide to detect CW energy. An output of the first detector is used to at least adjust a pump laser frequency of the pump laser. The second detector is in operational communication with the at least one bus waveguide. The second detector used to determine at least phase shifts in detected SBS energy to determine at least rotation.

In another example embodiment, another stimulated brillouin scattering gyroscope is provided. The gyroscope includes a pump laser, a bus waveguide, a waveguide resonator, a reflector, a Pound-Drever-Hall (PDH) detector, a parity-time (PT) detector and at least one controller. The pump laser is configured to generate continuous wave (CW) energy. The bus waveguide is in operational communication with the pump laser. The waveguide resonator is in operational communication with the bus waveguide. The reflector is in operational communication with the waveguide resonator to pass a first portion of the CW energy in a first direction and reflect a second portion in a second direction. The Pound-Drever-Hall (PDH) detector is in operational communication with the bus waveguide. The PDH detector is configured to detect CW energy. The parity-time (PT) detector is in operational communication with the bus waveguide, the PT detector used in part to detect SBS energy. The at least one controller is in operational communication with an output of the PDH detector and an output of the PT detector. The at least one controller is configured to determine if a parity-time symmetry is measured by the PT detector and to at least adjust a pump laser frequency of the pump laser based on an output of the PDH detector.

In yet another embodiment, a method of operating a stimulated Brillouin scattering gyroscope is provided. The method includes measuring resonance peaks in stimulated Brillouin scattering (SBS) energy in a waveguide resonator having a reflector positioned therein that is configured to split one resonance peak into tow resonance peaks; determining if a parity-time (PT) symmetry is present between the measured resonance peaks; and adjusting at least one of gain and loss to achieve PT symmetry when it is determined that a PT symmetry is not present.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a chip-scale high performance gyroscope. Embodiments increase the gyroscope signal by increasing the scale factor (SF) at low rotation rate. An exceptional point is created in one single resonator with the use of a reflector. While near the exceptional point, the phase shift changes with rotation rate non-linearly. In one example embodiment, the phase shift is proportional to the square root of the rotation rate. Therefore, SF increases while the rotation rate is small.

In describing components, the terms in "operational communication" or similar language may be used. The terms operational communication as used herein are used to convey the components may be directly connected to communicate energy, signals etc. or there may be intervening components between the communicating components that provide interfacing functions to establish the operational communication.

Figure 1:
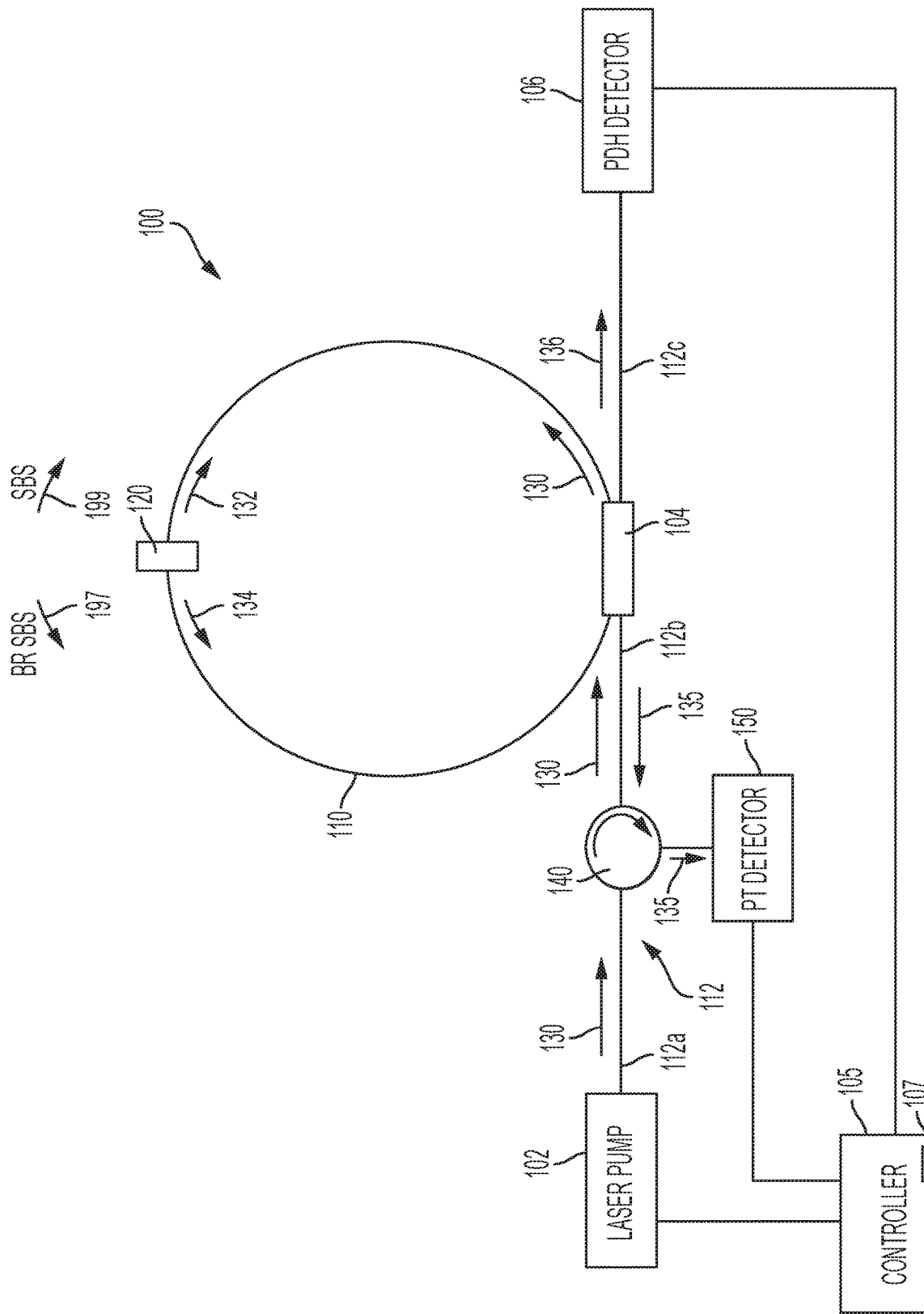
FIG. 1 illustrated a block diagram of a simulated brillouin scattering gyroscope according to one exemplary embodiment.

FIG. 1 illustrates a simplified block diagram of a Stimulated Brillouin Scattering (SBS) laser gyroscope 100 including a reflector 120 of one example embodiment. The laser gyroscope 100 is illustrated as including a pump laser 102, a waveguide resonator 110 and detectors 106 and 150. The pump laser 102 in an embodiment generate continuous wave (CW) energy or pump beam. The CW energy generated from the pump laser 102 is generally indicated by 130 in FIG. 1.

The CW energy 130 in this example, is operationally communicated to the waveguide resonator 110 via bus waveguide 112. The bus waveguide 112 in this example, includes a first bus waveguide portion 112a, a second bus waveguide portion 112b and a third bus waveguide portion 112c. In this example, the CW energy 130 is passed through the first bus waveguide portion 112a to a circulator 140. The circulator 140 directs the CW energy 130 to a coupling region 104 through the second bus waveguide portion 112b. The coupling region 104 is designed to couple CW energy 130 into the waveguide resonator 110. The pump laser beam 130 travels through the waveguide resonator 110 to the reflector 120 where some of the CW energy 134 is passed through the reflector 120 in a first counterclockwise direction and some of the CW energy 132 is reflected back in a second counterclockwise direction.

The reflector 120 in the resonator 110 splits the resonance peak into two resonance peaks. The majority CW energy 130 (pump beam) still propagates in the counter clockwise direction. When a SBS threshold is met in the waveguide resonator 110, the CW energy 130 will generate SBS beam 199 (or SBS energy 199) in the opposite second direction (clockwise). Further, a back reflected (BR) SBS beam 197 (or BR SBS energy 197) is also generated when the threshold is met that travels in the first counterclockwise direction.

The coupling region 104 passes CW energy from the waveguide resonator 110 to a Pound-Drever-Hall (PDH) detector 106 via bus waveguide portion 112c and a Parity-Time (PT) detector 150 via bus waveguide portion 112b and the circulator 140. The CW energy being passed to the PDH detector 106 is generally indicated by 136 and the SBS energy being passed to the PT detector 150 is generally indicated by 135. The circulator 140 is used to separate the CV energy 130 generated from the pump laser 102 from the SBS energy 135 returned by the resonator 110 through bus waveguide portion 112b.

The PDH detector 106 in this example is used in part as a feedback loop for PDH locking to lock the pump laser 102 to a resonance peak of the optical waveguide resonator 110. In this example, an output of the PDH detector 106 is communicated to a controller 105 that controls at least in part the frequency of the pump laser 102. The controller 105 may include a logic device or may be processor with a memory 107 that implements instructions stored in the memory 107 based on an output of the PDH detector 106 to adjust the frequency of the pump laser 102 to the resonance peak of the waveguide resonator 110 as described below.

As discussed above, the back reflection generated by the reflector 120 in the waveguide resonator 110 couples some of SBS energy 199 back the opposite direction and splits the resonance into two resonance peaks. By adjusting the gain in one direction and loss in the other direction, a parity-time (PT) symmetry condition can be achieved. At such exceptional point, two split resonance peaks will coalesce. Outputs of the PT detector 150 may be used, by the controller 105, as discussed below to set the PT symmetry condition.

In general, the controller 105 may include any one or more of a processor, microprocessor, a digital signal processor (DSP), an application specific integrated circuit (ASIC), a field program gate array (FPGA), or equivalent discrete or integrated logic circuitry. In some example embodiments, controller 105 may include multiple components, such as any combination of one or more microprocessors, one or more controllers, one or more DSPs, one or more ASICs, one or more FPGAs, as well as other discrete or integrated logic circuitry. The functions attributed to the controller 105 herein may be embodied as software, firmware, hardware or any combination thereof. The controller 105 may be part of a system controller or a component controller. The memory 107 may include computer-readable operating instructions that, when executed by the controller 105 provides functions of the gyroscope 100. Such functions may include the functions of 106 to adjust the frequency of the pump laser 102 to the resonance peak of the waveguide resonator 110 and adjusting the gain in one direction and loss in the other direction to achieve parity-time (PT) symmetry. The computer readable instructions may be encoded within the memory 107. Memory 107 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

The PT detector 150 is also used to determine rotation of the gyroscope 100. While the waveguide resonator 110 is under rotation, the phase shift due to Sagnac effect will split the two degenerated resonance frequencies. The frequency difference, read by the PT detector 150, between these two resonances is proportional to the square root of the rotation. Therefore the scale factor is enhanced while the rotation is smaller than 1 radiance/sec. A key to implementation with the exceptional point is to create a non-reciprocal gain/loss between CW and CCW direction. Since SBS gain is a nonlinear effect which is not reciprocal, it can be used to create an exceptional point which can be used to improve the gyroscope scale factor under low rotation rate.

As discussed above, one key to implementation is to generate an exceptional point in a photonic system. This can be achieved by coupling a cavity system together where one resonator is subject to a gain and the other is seeing a loss. The gain may be controlled by adjusting the pumping power of the pump laser 102. In particular, the gain is provided by SBS gain that is generated by the pump laser 102 in the opposite direction. For example, by adjusting the power in the second clockwise direction, we can control the SBS gain in the first counterclockwise direction.

As discussed above, in an embodiment, the controller 105 is at least in part configured to control the power of the pump laser 102. The loss in the second clockwise direction is determined by the cavity loss. The reflectivity of the reflector 120 may be controlled by design. For example, the reflector 120 may be a section of Bragg reflector in the waveguide resonator 110. It is a type of reflector that is constructed in a short segment of waveguide that reflects particular wavelengths of light while allowing other wavelengths of light to pass through. The reflectivity and wavelength of the reflector may be controlled by using different grating strength or grading length. For example, one can modify the waveguide width periodically and make the period equal to half of the wavelength. The modulation amplitude will determine the reflection bandwidth. The reflectivity increases with the grating length and modulation amplitude.

Figures 2A, 2B:
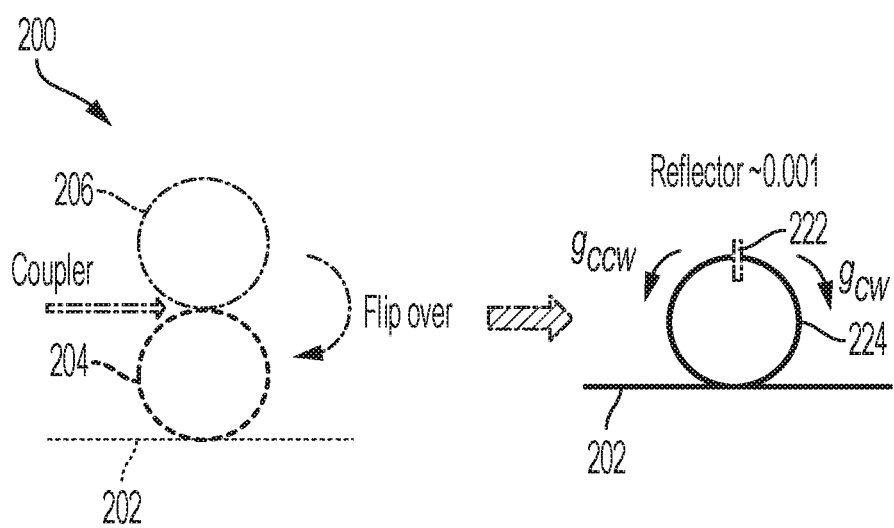
FIGS. 2A and 2B illustrate the formation of a waveguide resonator of a simulated brillouin scattering gyroscope according to one exemplary embodiment.

An illustration of the configuration of an optical waveguide resonator that leads to the use of the exceptional point, in one example embodiment, is illustrated in FIGS. 2A and 2B. In FIG. 2A, a symmetric arrangement of a double ring resonator 200 formed with a first ring resonator portion 204 and a second ring resonator portion 206 is shown. The double ring resonator 200 includes a bus waveguide 202 that is used to deliver and receive energy (CW energy) to and from the first ring resonator portion 204 and the second ring resonator portion 206 of the double ring resonator 200. In a traditional arrangement, a coupler would be used to pass energy between the first ring resonator 204 and the second ring resonator 204. The resonators 204 and 206 in this example are placed close enough that light can be coupled back and forth through the evanescent wave. Such a coupling splits resonance frequency of the two identical resonance into two resonance frequencies. The unbalanced gain in the first counterclockwise and second clockwise directions leads to the exceptional point (degenerated resonance frequency). At the exceptional point, the resonance has a higher sensitivity. A rotation of the waveguide resonators 204 and 206 break the PT symmetry and results in the resonance split. FIG. 2B illustrates a formed resonator 224 of an embodiment using the concepts of FIG. 2A in a compact package that implements a reflector 222 instead of the first ring portion and a second ring portion or FIG. 2A. Resonator 224 is similar to resonator 110 of FIG. 1.

Figure 3:
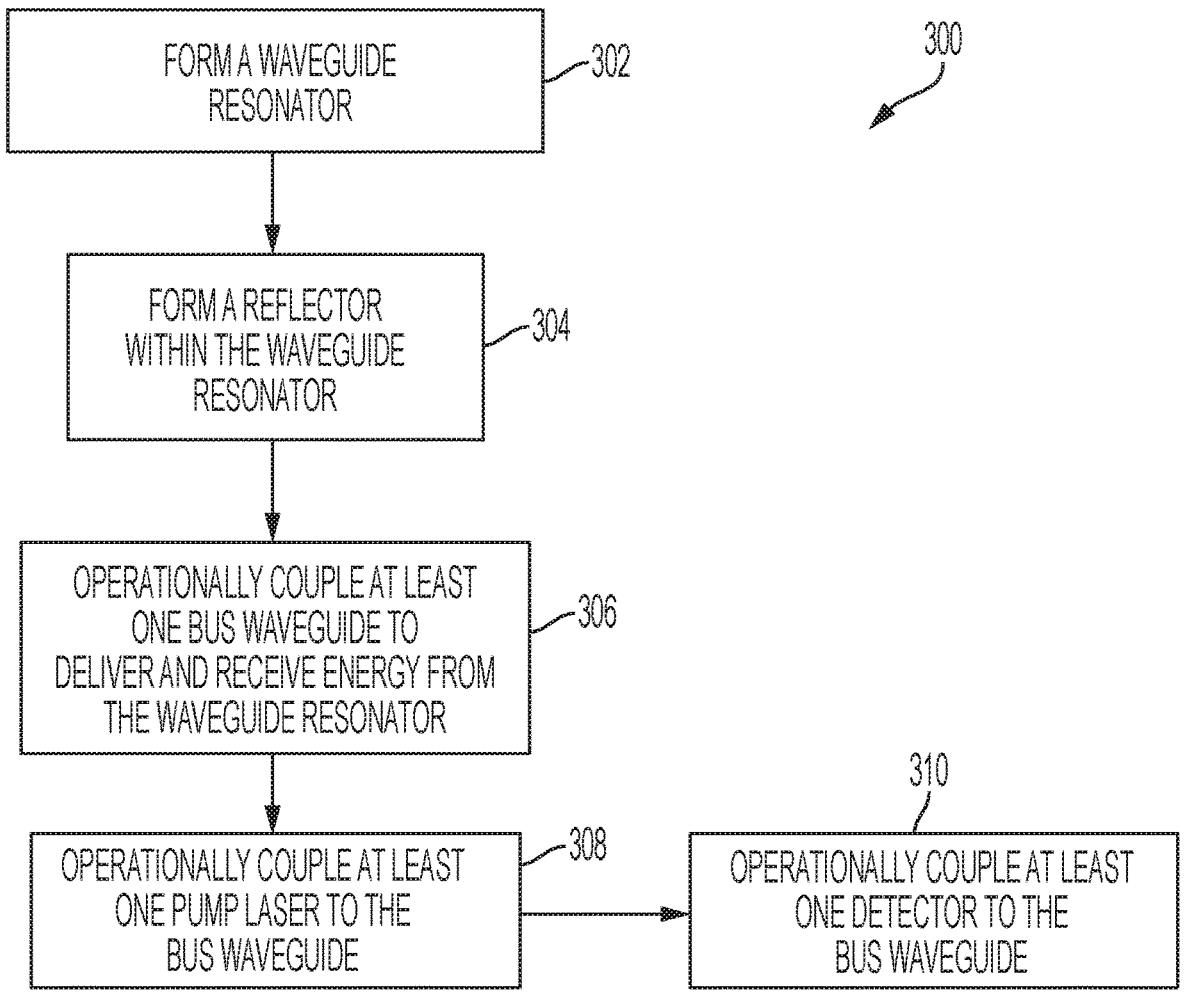
FIG. 3 illustrates a formation flow diagram according to one exemplary embodiment.

A formation flow diagram 300 of a stimulated brillouin scattering gyroscope of an example embodiment is illustrated in FIG. 3. The formation flow diagram 300 is provided at a series of sequential high level blocks. The sequence and even the content of the blocks may be different in other embodiment. Hence, embodiments are not limited the specific sequence or specific blocks.

In the example embodiment of FIG. 3, a waveguide resonator, such as waveguide resonator 110, is formed at block (302). A reflector 120 is formed within the waveguide resonator at block (304). At least one bus waveguide, such as bus waveguide 112 is coupled to the waveguide resonator 110 at block (306) of FIG. 3. At least one energy generator, such as pump laser 102 of FIG. 1, is operationally coupled to the bus waveguide 112 at block (308). Further, at least one detector, such as detectors 106 and 150 of FIG. 1, are also operationally coupled to the bus waveguide 112 at block (310).

Figure 4:
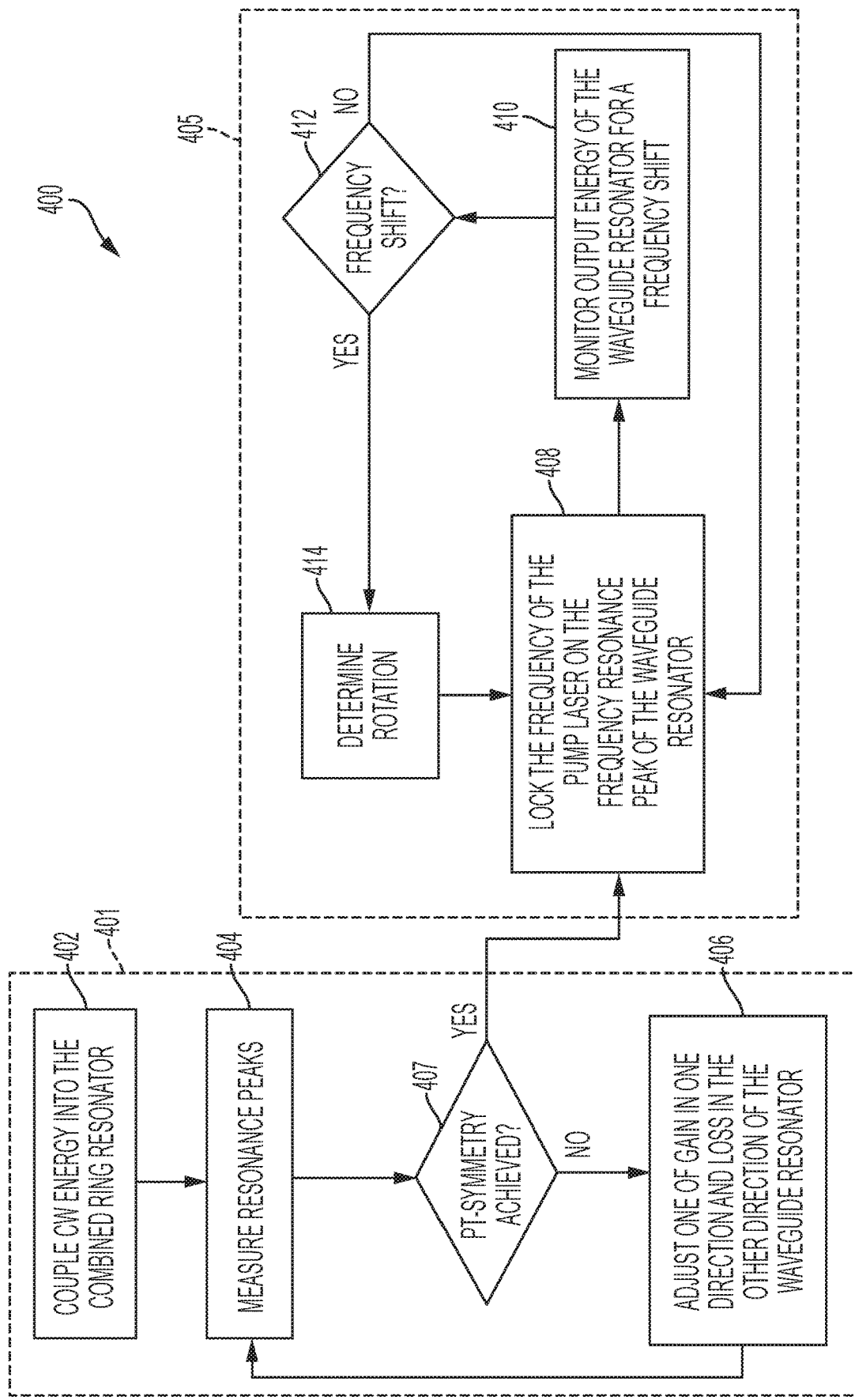
FIG. 4 illustrates an operational SBS gyroscope flow diagram according to one exemplary embodiment.

Referring to FIG. 4, an operational SBS gyroscope flow diagram 400 is illustrated in FIG. 4. The operational SBS gyroscope flow diagram 400 is provided as a series of sequential high level blocks. The sequence of the blocks and the content of blocks themselves may differ in other embodiments. Hence, embodiments are not limited the specific sequence or specific blocks. Further, the operational SBS gyroscope flow diagram 400 is illustrated as including blocks (401) associated with an initial calibration and blocks (405) associated with operation. The initial calibration blocks (401) may be performed one time, at set intervals or at other times.

The initial calibration blocks (401), include block (402) where energy from an energy generating source, such as pump laser 102, couples or introduces CW energy into a waveguide resonation that includes a reflector, such as resonator 110 and reflector 120 of FIG. 1. As discussed above, the reflector 110 will split the resonator peak into two resonance peaks. The resonance peaks as the result of the CW energy encountering the reflector in the waveguide resonator are measured at block (404). This may be done by the PDH detector 106 of FIG. 1.

It is determined at block (407) if PT-symmetry is achieved. In one embodiment, this is done with a controller, such as controller 105. If PT-symmetry is not achieved at block (407), at least one of gain in one direction or loss in the other direction is adjusted at block (406). As discussed above, the gain may be controlled by adjusting the power of the energy introduced into the waveguide resonator. In in one embodiment a controller, such as controller 105 is used to control of the energy power output of the pump laser. A loss may be adjusted for example by changing a cavity loss. This may be done by changing out the optical coupler 104 and/or the reflector 120 to achieve a desired loss. In a further example, a desired loss may be achieved by adjusting a pressure on a fiber Bragg grating (FGB) used to form the reflector 102 (a Bragg reflector). The stress variation on the reflector will change the reflectivity of the reflector 102. Once, PT-symmetry is reached at block (407), the initial calibration blocks 401 are complete.

The operational blocks (405) of the operational SBS gyroscope flow diagram 400 include, as set out in block (408), a locking of the frequency of the energy generator, such as pump laser 102, to the frequency resonance peak of the waveguide resonator. This is done in an embodiment with the use of an output of the PDH detector provided to feedback loop that includes the controller 105. The feedback loop is used to control the frequency of the energy generator, such as the pump laser 102.

A second detector, such as PT detector 150, is used to monitor the output energy from the combined ring laser for a frequency shift at block (410). If no frequency shift is detected at block (412), the process continues at bock (408) to maintain the locking of the frequency of the energy generator to the frequency resonance peak of the waveguide resonator, such as waveguide resonators 110 and 224 discussed above. If a frequency shift is detected at block (412), rotation of the SBS gyroscope is determined at block (414). In this example, the process then continues at bock (408) locking the frequency of the energy generator to the frequency resonance peak of the combined ring resonator.

EXAMPLE EMBODIMENTS

Example 1 includes a stimulated brillouin scattering gyroscope. The gyroscope includes a pump laser, at least one bus waveguide, a waveguide resonator, a reflector and a first and second detector. The pump laser is configured to generate continuous wave (CW) energy. The at least one bus waveguide is in operational communication with the pump laser. The waveguide resonator is in operational communication with the at least one bus waveguide to receive and pass the CW energy. The reflector is positioned within the waveguide resonator. The reflector is configured to pass at least some of the CW energy in a first direction and reflect at least stimulated Brillion scattering (SBS) energy in a second direction. A first detector is in operational communication with the at least one bus waveguide to detect CW energy. An output of the first detector is used to at least adjust a pump laser frequency of the pump laser. The second detector is in operational communication with the at least one bus waveguide. The second detector used to determine at least phase shifts in detected SBS energy to determine at least rotation.

Example 2 includes the gyroscope of Example 1, wherein the first detector is part of a feedback loop used at least in part to lock a frequency of the pump laser to a resonance peak of the waveguide resonator.

Example 3 includes the gyroscope of any of the Examples 1-2, wherein the reflector is configured to split a resonance peak of the waveguide resonator into two resonance peaks.

Example 4 includes the gyroscope of any of Example 3, further includes at least one controller configured to adjust a power of the pump laser to achieve a parity-time (PT) symmetry condition where the two resonance peaks coalesce.

Example 5 includes the gyroscope of any of the Examples 1-4, further including a circulator configured to direct CW energy in a first portion of the bus waveguide from the pump laser to the waveguide resonator and to direct SBS energy from the waveguide resonator to the second detector.

Example 6 includes the gyroscope of any of the Examples 1-5, further including a coupler that is configured to direct CW energy into the waveguide resonator and CW energy from the waveguide resonator to the first detector.

Example 7 includes the gyroscope of any of the Examples 1-6, wherein the reflector is made of a Bragg reflector of a select reflectivity and wavelength.

Example 8 includes the gyroscope of any of the Examples 1-7, wherein the first detector is a Pound-Drever-Hall (PDH) detector.

Example 9 includes the gyroscope of any of the Examples 1-8, wherein the second detector is a parity-time (PT) detector.

Example 10 includes a stimulated Brillouin scattering gyroscope. The gyroscope includes a pump laser, a bus waveguide, a waveguide resonator, a reflector, a Pound-Drever-Hall (PDH) detector, a parity-time (PT) detector and at least one controller. The pump laser is configured to generate continuous wave (CW) energy. The bus waveguide is in operational communication with the pump laser. The waveguide resonator is in operational communication with the bus waveguide. The reflector is in operational communication with the waveguide resonator to pass a first portion of the CW energy in a first direction and reflect a second portion in a second direction. The Pound-Drever-Hall (PDH) detector is in operational communication with the bus waveguide. The PDH detector is configured to detect CW energy. The parity-time (PT) detector is in operational communication with the bus waveguide, the PT detector used in part to detect SBS energy. The at least one controller is in operational communication with an output of the PDH detector and an output of the PT detector. The at least one controller is configured to determine if a parity-time symmetry is measured by the PT detector and to at least adjust a pump laser frequency of the pump laser based on an output of the PDH detector.

Example 11 includes the gyroscope of Example 10, wherein the reflector is a Bragg reflector.

Example 12 includes the gyroscope of any of the Examples 10-11, further including at least one of a circulator configured to direct CW energy in a first portion of the bus waveguide from the pump laser to the waveguide resonator and to direct SBS energy from the waveguide resonator to the PT detector and a coupler configured to direct CW energy into the waveguide resonator and CW energy from the waveguide resonator to the first detector.

Example 13 includes a gyroscope of any of the examples 10-12, wherein the controller is configured to adjust a power of the pump laser to achieve a PT symmetry condition.

Example 14 includes a gyroscope of any of the examples 10-13, wherein the controller is further configured to lock the frequency of the pump laser to a frequency resonance peak of the waveguide resonator ring detected by the PHD detector.

Example 15 includes a method of operating a stimulated Brillouin scattering gyroscope. The method includes measuring resonance peaks in stimulated Brillouin scattering (SBS) energy in a waveguide resonator having a reflector positioned therein that is configured to split one resonance peak into tow resonance peaks; determining if a parity-time (PT) symmetry is present between the measured resonance peaks; and adjusting at least one of gain and loss to achieve PT symmetry when it is determined that a PT symmetry is not present.

Example 16 includes the method of Example 15, wherein adjusting the gain further includes adjusting a power of the CW energy traversing through the waveguide resonator.

Example 17 includes the method of any of the Examples 15-16, further including locking the frequency of a pump laser that generates the CW energy traversing through the waveguide resonator to a frequency resonance peak provided by the waveguide resonator.

Example 18 includes the method of any of the Examples 15-17, further including using a feedback loop to control the frequency of the energy generator that includes a Pound-Drever-Hall (PDH) detector.

Example 19 includes the method of any of the Examples 15-18, further including controlling the reflectivity of the reflector by using a Bragg reflector of at least one of a select strength and length.

Example 20 includes the method of any of the Examples 15-19, further including monitoring an output energy of the waveguide resonator for a phase shift; and determining rotation based on the phase shift.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A stimulated Brillouin scattering gyroscope, the gyroscope comprising:
   a pump laser configured to generate continuous wave (CW) energy;
   at least one bus waveguide in operational communication with the pump laser;
   a waveguide resonator in operational communication with the at least one bus waveguide to receive and pass the CW energy;
   a reflector positioned within the waveguide resonator, the reflector configured to pass at least some of the CW energy in a first direction and reflect at least stimulated Brillouin scattering (SBS) energy in a second direction and split a resonance peak of the waveguide resonator into two resonance peaks;
   a first detector being in operational communication with the at least one bus waveguide to detect CW energy, an output of the first detector used to at least adjust a pump laser frequency of the pump laser;
   a second detector in operational communication with the at least one bus waveguide, the second detector used to determine at least phase shifts in detected SBS energy to determine at least rotation; and at least one controller configured to adjust a power of the pump laser to achieve a parity-time (PT) symmetry condition where the two resonance peaks coalesce.

2. The gyroscope of claim 1, wherein the first detector is part of a feedback loop used at least in part to lock a frequency of the pump laser to a resonance peak of the waveguide resonator.

3. The gyroscope of claim 1, further comprising:
a circulator configured to direct CW energy in a first portion of the bus waveguide from the pump laser to the waveguide resonator and to direct SBS energy from the waveguide resonator to the second detector.

4. The gyroscope of claim 1, further comprising:
a coupler configured to direct CW energy into the waveguide resonator and CW energy from the waveguide resonator to the first detector.

5. The gyroscope of claim 1, wherein the reflector is made of a Bragg reflector configured to reflect select wavelengths of light while allowing other wavelengths of light to pass through.

6. The gyroscope of claim 1, wherein the first detector is a Pound-Drever-Hall (PDH) detector.

7. The gyroscope of claim 1, wherein the second detector is a parity-time (PT) detector.

8. A stimulated Brillouin scattering gyroscope, the gyroscope comprising:
a pump laser configured to generate continuous wave (CW) energy;
a bus waveguide in operational communication with the pump laser;
a waveguide resonator in operational communication with the bus waveguide;
a reflector in operational communication with the waveguide resonator to pass a first portion of the CW energy in a first direction and reflect a second portion in a second direction;
a Pound-Drever-Hall (PDH) detector in operational communication with the bus waveguide, the PDH detector configured to detect CW energy;
a parity-time (PT) detector in operational communication with the bus waveguide, the PT detector used in part to detect SBS energy; and
at least one controller in operational communication with an output of the PDH detector and an output of the PT detector, the at least one controller configured to determine if a parity-time symmetry is measured by the PT detector and to at least adjust a pump laser frequency of the pump laser based on an output of the PDH detector.

9. The gyroscope of claim 8, wherein the reflector is a Bragg reflector.

10. The gyroscope of claim 8, further comprising at least one of:
a circulator configured to direct CW energy in a first portion of the bus waveguide from the pump laser to the waveguide resonator and to direct SBS energy from the waveguide resonator to the second detector; and
a coupler configured to direct CW energy into the waveguide resonator and CW energy from the waveguide resonator to the first detector.

11. The gyroscope of claim 8 wherein the controller is configured to adjust a power of the pump laser to achieve a PT symmetry condition.

12. The gyroscope of claim 8, wherein the controller is further configured to lock the frequency of the pump laser to a frequency resonance peak of the waveguide resonator ring detected by the PHD detector.

13. A method of operating a stimulated Brillouin scattering gyroscope, the method comprising:
measuring resonance peaks in stimulated Brillouin scattering (SBS) energy in a waveguide resonator having a reflector positioned therein that is configured to split one resonance peak into two resonance peaks;
determining if a parity-time (PT) symmetry is present between the measured resonance peaks; and
adjusting at least one of gain and loss to achieve PT symmetry when it is determined that a PT symmetry is not present.

14. The method of claim 13, wherein adjusting the gain further comprises:
adjusting a power of the CW energy traversing through the waveguide resonator.

15. The method of claim 13, further comprising:
locking the frequency of a pump laser that generates the CW energy traversing through the waveguide resonator to a frequency resonance peak provided by the waveguide resonator.

16. The method of claim 13, further comprising:
using a feedback loop to control the frequency of the energy generator that includes a Pound-Drever-Hall (PDH) detector.

17. The method of claim 13, further comprising:
controlling the reflectivity of the reflector by using a Bragg reflector configured to reflect select wavelengths of light while allowing other wavelengths of light to pass through.

18. The method of claim 13, further comprising:
monitoring an output energy of the waveguide resonator for a phase shift; and
determining rotation based on the phase shift.

* * * * *